United States Patent [19]

Thornton et al.

[11] Patent Number: 4,517,209

[45] Date of Patent: May 14, 1985

[54] METHOD OF PREPARING A BISCUIT OR COOKIE PRODUCT

[75] Inventors: Ian Thornton, Flackwell Heath; Kenneth W. DeWitt, Reading; Simon A. Robertson, West Reading, all of England

[73] Assignee: Keebler Company, Elmhurst, Ill.

[21] Appl. No.: 409,115

[22] Filed: Aug. 18, 1982

[51] Int. Cl.$^3$ .............................................. A21D 8/00
[52] U.S. Cl. ...................................... 426/383; 426/560
[58] Field of Search ............... 426/549, 560, 502, 512, 426/383, 87; 99/404

[56] References Cited

U.S. PATENT DOCUMENTS

| | | | |
|---|---|---|---|
| 3,536,014 | 10/1970 | Kuchuris | 107/8 |
| 4,111,624 | 9/1978 | Hanson | 426/383 |

FOREIGN PATENT DOCUMENTS

| | | |
|---|---|---|
| 1432991 | 2/1969 | Fed. Rep. of Germany . |
| 324699 | 4/1903 | France . |
| 901116 | 7/1945 | France . |
| 900292 | 7/1962 | United Kingdom . |
| 1580442 | 12/1980 | United Kingdom . |

OTHER PUBLICATIONS

Matz, *Cookies and Cracker Technology*, Avi Pub. Co. Inc., Conn., 1968, pp. 3, 81, 217–227.

*Primary Examiner*—Raymond Jones
*Assistant Examiner*—Elizabeth A. King
*Attorney, Agent, or Firm*—Lockwood, Alex, FitzGibbon & Cummings

[57] ABSTRACT

A biscuit or cookie and method of manufacture of same includes forming a quantity of unbaked dough into a shaped, unbaked dough piece. A network of lines comprising grooves is impressed into the upper surface of the unbaked dough piece, either in conjunction with or subsequent to forming of the dough piece. A major portion of the lines in the network are non-terminated lines which continue across the surface of the dough piece and intersect either the edge of the dough piece or another line, and a minor portion of the lines are terminated lines which end short of either the edge or another line at least at one end thereof. The shaped dough piece with the network of impressed lines is baked under such conditions as to increase its diameter by from one-tenth to one-half and to form superficial fissures along at least some of the impressed lines and at least in some of the areas of the upper surface of the dough piece upon which lines were not previously impressed.

16 Claims, 7 Drawing Figures

METHOD OF PREPARING A BISCUIT OR COOKIE PRODUCT

DESCRIPTION

This invention relates to biscuit manufacture and is concerned with an improved method of manufacturing biscuits of the type exemplified by cookies and ginger snaps, namely biscuits which have a cracked surface and are typically formed from doughs of high-fat and-/or high-sugar content. The invention also relates to the biscuits produced by this improved method.

Wire-cut cookies are made by feeding an appropriately-formulated dough downwardly through one or more verticle tubes located over an oven band and passing a cutting wire at intervals through the columns of dough as they leave the tubes, so that discrete circular discs of the dough are deposited upon the oven band. The baking step carried out during passage through the oven is effected under controlled conditions, sometimes with the spraying of steam into the oven. The resultant cookies have a haphazard fissured or cracked upper surface, which is not only attractive in appearance, but is also essential to the eating character of the product. The fissures or cracks in the biscuit surface arise naturally in the oven, as the initially plain-surfaced dough piece spreads out as it cooks. Wire-cut dough pieces necessarily have flat top surfaces and one difficulty of this method of manufacture is the poor degree of control of the size, shape and appearance of the products so made. Because these products lack machine-made uniformity and are of high quality, there is a continuing demand for them. However, their manufacture is inefficient and expensive and the method is also relatively difficult to carry out.

In addition to the manufacturing difficulties already mentioned, the irregularity of the products precludes the use of automated wrapping techniques. Thus, cookies and other cracked-surface high quality biscuit products are subject to some or all of a number of limitations, which may be summarized as:

(1) relatively expensive recipes;
(2) inefficient forming methods;
(3) slow baking in the oven;
(4) restricted final eating characteristics;
(5) mis-shapen products and therefore inablility to use efficient packaging methods.

It has been discovered that biscuits having a cracked or fissured surface, such as is typical of cookies and ginger snaps, can be made efficiently and with considerably improved uniformity of shape and dimensions, but also with an attractive and satisfactory variety in the location of the cracks or fissures in the surface, so that all the advantages of conventional cookies, ginger snaps and similar products are retained and yet the disadvantages of conventional manufacturing and handling procedures are reduced or even eliminated.

In order to make biscuits in accordance with the invention, while avoiding the problems of the known methods and gaining the additional benefits indicated, it has been found to be effective to form the dough into shaped pieces and subject these dough pieces to a marking or moulding technique which impresses a network of lines upon or into its upper surface in such a way that the lines serve as "instructions" as to how the piece is to develop the desired fissures or cracks while undergoing baking. However, the success of the method depends upon achieving a balance between a number of factors and these include ensuring that the "instructions" represented by the impressed lines constitute a major part but not the totality of the conditions which determine the nature of the fissured or cracked upper surface of the final product. In other words, the method involves impressing lines into the dough piece so that fissures or cracks will develop as a result of these lines and it also involves allowing a certain degree of randomness in fissure or crack formation. The result of this latter feature is that, although the impressed dough pieces are, in effect, substantially completely identical as they start the baking step, each finished biscuit has an individual cracked surface which is different from any other. Three main effects are responsible for the achievement of this desirable result. Firstly, the permitted degree of randomness allows each dough piece to produce cracks in directions and to lengths, widths and depths which are not found in other dough pieces. Secondly, the impressed series or network of lines allows each dough piece to produce cracks in accordance with those lines, but in such a way that the cracks vary in depth, width and other features from one finished biscuit to another. Thirdly, some of the impressed lines preferably terminate without reaching other lines or the edge of the dough piece and these "terminated" lines induce the formation of cracks, of random length, width, depth and/or direction in some or all of the areas of the biscuit surface not initially provided with any of the crack-forming lines of the impressed network.

In addition to the application of indented lines in a network or arrangement of a particular type, described below in more detail, the method of the invention requires the formation of the dough pieces into a shape which takes account of the settling and spreading of the dough as it is baked. Typically, the final biscuit, which is essentially a generally flat circular disc, is derived from a shaped dough piece having a circular shape in plan, a flat under-surface formed by contact with the oven band and an upper surface which, disregarding the impressed lines forming the "instructions" where cracking is desired, is domed, having its maximum height at the centre and curving down to the edge. During baking, the circular dough piece settles to a substantially regular thickness, because its upper surface changes from being domed to being generally flat, its diameter increases typically by 10% to 40% and the applied impressed lines not only induce the desired formation of cracks in the top surface, but the cracks spread out and can even flow downwardly adjacent the rim and move towards the underside at the edges of the dough piece. Comparison of a finished biscuit with the kind of dough piece from which it has been made will typically reveal that the edge of the finished biscuit comes from a circle located inside the edge of the unbaked dough piece and having a diameter of perhaps 70% of that of the dough piece itself. Since the dough piece is domed, its maximum thickness is at the centre and therefore the rate of outward spreading of the dough varies from the centre to the edge.

The method of the invention also depends for its success upon the depth, cross-sectional shape, type of distribution and width of the lines formed in the dough piece and also upon the relationship between the network formed by these lines and the nature, including the consistency, viscosity, plasticity and granulometry, of the dough and the way these properties of the dough are affected by the baking process. Many types of patterns have been found not to give the desired results. Among the reasons why some patterns of lines have proved unsatisfactory are:

(1) the constituent lines are oriented so that a majority of them lie in or near a given direction across the dough piece;

(2) the lines are too closely spaced;

(3) the lines are distributed unduly uniformly so as to affect in the same way most of the surface of the dough piece;

(4) the lines are insufficiently deeply impressed to initiate crack formation.

Among the characteristics which extensive experiment has indicated to be required or highly desirable, are:

(1) the lines are U-shaped, W-shaped or V-shaped in cross-section, preferably either of the latter with their sides forming an angle within the range from 20° to 50°, preferably from 30° to 40° and most preferably 35°;

(2) the lines have a depth, depending upon the consistency and other properties of the dough, in the range from 0.5 to 2 mm and preferably from 1 to 1.5 mm;

(3) most of the lines, for instance from 60% to 90% of the total length of the lines, continue across the dough piece surface from and/or to the edge or another line; for convenience, these can be regarded as "non-terminated" in that they do not have a free end within an unmarked area of the dough piece surface; the remainder of the lines terminate short of the edge or another line at one or both of their ends and the majority of these "terminated" lines are concentrated around the centre of the dough piece surface; typically, the terminated lines are located within a central area having half the diameter of the dough piece;

(4) the existence of the lines in any unit of area of the dough piece surface has a mean statistical probability which can be expressed mathematically in many ways; for instance, with a dough piece 50 mm in diameter, which grows 40%, i.e. to 70 mm in diameter, on baking, the line distribution can be expressed as being from 2 to 4 portions of line per square centimeter.

In accordance with the present invention, therefore, a method of biscuit manufacture comprises (1) forming a shaped unbaked dough piece with a domed upper surface, (2) impressing an arrangement or network of lines upon or into the domed upper surface either in conjunction with formation of the dough piece or as a subsequent operation, the arrangement or network of lines including a major proportion which are non-terminated and a minor proportion which are terminated at least at one location, and (3) baking the dough piece under such conditions that its diameter increases by at least one tenth and up to one half, that it thereby spreads and settles so as to assume an undomed shape and that the formation of fissures or cracks occurs along all or most of the impressed lines and in or into at least some of those areas of the surface not provided with any of the impressed network of lines.

A biscuit, according to another aspect of this invention, comprises a product, whether or not made by the method of the invention, as defined above, which has a circular or other shape, a surface which is fissured or cracked sufficiently randomly to be individually distinctive and recognizably different from other products made from the same materials by the same method and a sufficiently uniform thickness to allow at least 10 of such products to be stacked.

One of the simplest known methods of biscuit forming is rotary moulding, in which an engraving is made in the surface of a roller which is the negative of the design intended for the biscuit. Portions of dough deposited upon a support are moulded as they pass the rotating engraved roller. Attempts have been made to apply rotary moulding to the manufacture of biscuits having a fissured or cracked surface, but these attempts have been unsuccessful because the results look artificial and unattractive. The biscuits so produced lack the haphazard appearance of naturally fissured products. It has now been discovered, however, that rotary moulding can be employed in a particular way of carrying out the manufacture of biscuits according to this invention. By engraving a design in the form of a network of shallow weakness lines on each domed dough piece, by using an appropriately-shaped rotary moulder, the dough pieces can then be baked so as to form the desired product. Other methods of applying the network of weakness lines to the dough pieces can also be employed, for instance by so simple a method as the use of a hand-held moulding stamp, but rotary moulding lends itself to volume production and represents a preferred way of preparing each dough piece for the baking stage, in carrying out the manufacture of biscuits according to the method of this invention. In carrying out this embodiment of the method, it is necessary, whatever the type of mould or moulder used, to make it from a material which allows clean separation of each dough piece.

The method of the present invention allows one or more of the following valuable advantages to be realized:

(1) use of cheaper recipes;

(2) faster baking periods;

(3) a greater variety of product types;

(4) the use of standard equipment, e.g. rotary moulders;

(5) better control of unit weight of the products, thus improving the cost factor of manufacture;

(6) better control of shape, thus allowing the use of more efficient weighing and wrapping technique and pack styles;

(7) simple and more predictable manufacture;

(8) production of a uniformly attractive product.

In order that the method and product of this invention may be more fully understood, reference is made to the accompanying drawing, which shows diagrammatically typical cookies made by a known method and typical cookies made by the method of the invention, together with various views of the pattern of the mould used to form the dough pieces in one preferred embodiment of the method of the invention. In the accompanying drawing.

Figure 1A:
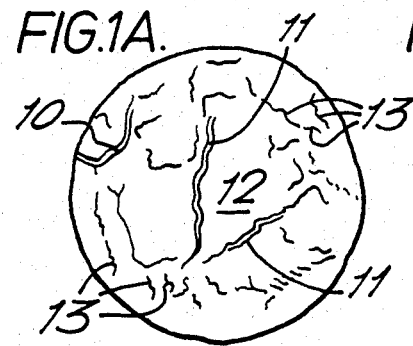
FIGS. 1A and 1B are diagrammatic representations of the cracked or fissured top surfaces of two typical wire-cut cookies, in which single lines have been added to emphasise the location of narrow and/or shallow cracks or fissures and double lines have been added to emphasise the location of broad and/or deep cracks or fissures.
Figure 1B:
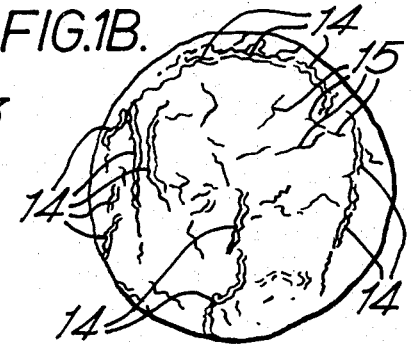
Figure 2A:
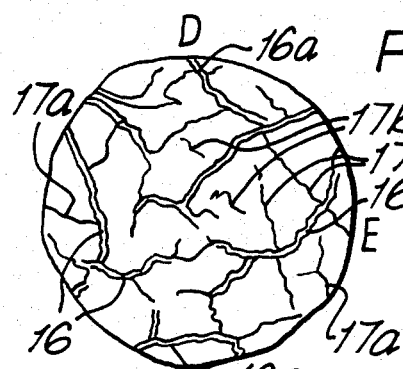
FIGS. 2A and 2B are diagrammatic representations made on the same basis as FIGS. 1A and 1B of two typical cookies of this invention.
Figure 2B:
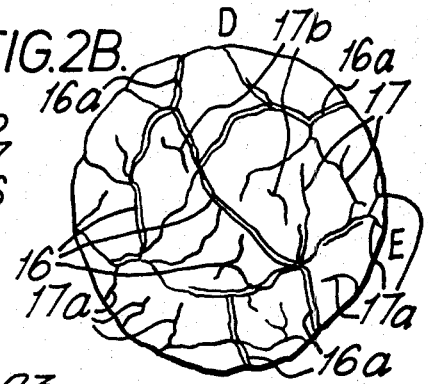

All the representations shown in FIGS. 1A and 1B and FIGS. 2A and 2B have been taken from actual samples, the illustrations of which have then been somewhat simplified and shown with increased contrast as indicated above, so as to emphasise the main characteristics. The two samples of products of the invention shown in FIGS. 2A and 2B were made from the same mould, which itself was derived from the typical mould-forming pattern illustrated in FIGS. 3 and 4; FIGS. 2A, 2B and 4 are shown in the identical orientation, to illustrate how the crack-generating lines of FIG. 4 cause portions made from the same dough to behave in the oven with a desired degree of randomness. For example, the features extending between the points D and E in FIGS. 2A and 2B have been derived from the part of the pattern represented by the lines extending between d and e in FIG. 4.

Referring to FIGS. 1A and 1B, two typical wire-cut cookies are shown, to illustrate how the surface cracks which are formed can vary over different parts of the surface of a biscuit and also as between individual biscuits. FIG. 1A shows a product having very few deep or wide cracks. One such crack, indicated at 10, extends in from the edge, while the others, indicated at 11, extend across the central area and leave a region 12 between them entirely free from any cracks. The remainder are narrow, shallow and mostly short cracks 13. FIG. 1B shows a product having a considerable number of deep and/or wide cracks 14, most of which lie very near to or extend from the edge of the biscuit. The remaining cracks 15 are narrow and/or shallow and hardly any join up with others of the cracks 14 or 15. Virtually none of the cracks in the products shown in FIGS. 1A and 1B extend to the edges.

Referring to FIGS. 2A and 2B, two typical cookies are shown, made by the method of the invention. The main surface features of each consist of wide and/or deep cracks 16 distributed over the entire upper surface of the product, some of which (16a) extend to the edge, together with narrow and/or shallow cracks 17 distributed over the entire upper surface of the product, some of which (17a) extend to the edge and some of which (17b) are virtually unconnected with any of the other cracks 16 or 17. The similar orientation of FIGS. 2A and 2B also illustrates how the cracks and fissures 16,17 so produced are distributed over the whole surface, so that all of it has the same general character, and yet the variability permitted by the method allows individual products to be recognizably different. Nevertheless, the products are regular in their circular shape and in particular their nominal thickness, so that 10 or more of the biscuits illustrated by those shown in FIGS. 2A and 2B can be stacked, for instance, in the initial stage of an automated wrapping and packaging operation, whereas the wire-cut products typified by FIGS. 1A and 1B cannot be satisfactorily stacked in this way and thus also cannot be machine-wrapped and packaged. It is to be understood that FIGS. 1A and 1B and FIGS. 2A and 2B show examples of products of certain types, as already described in detail, and the particular detailed features shown in FIGS. 2A and 2B are in no way intended to be limitative of the products of the invention, but instead are intended to point out some of their main characteristics.

Figure 3:
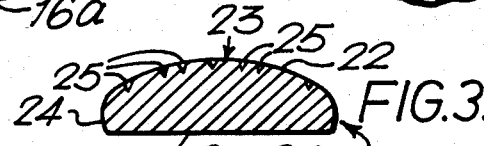
FIG. 3 shows the pattern used to make the mould from which dough pieces are made in order to make the biscuits of FIGS. 2A and 2B, the pattern being shown in cross-section along a diagonal.
Figure 4:
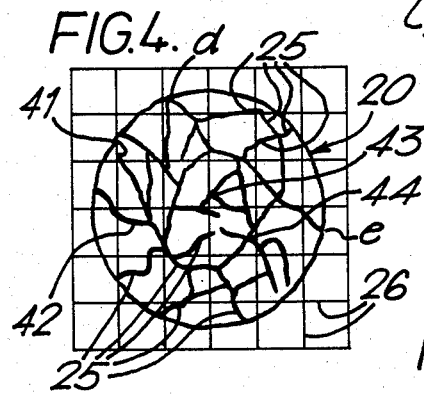
FIG. 4 shows the pattern of FIG. 3 in plan view superimposed upon a 1 cm square grid.

FIGS. 3 and 4 respectively show in section along a diagonal and in plan view a typical pattern used to make a typical mould, which in turn is used to make the shaped dough pieces placed on the oven band or otherwise prepared ready for baking. Since a pattern is a reproduction of the article made in the corresponding mould, FIGS. 3 and 4 can also be regarded as showing the dough piece. These illustrations are shown to the same scale as FIGS. 2A and 2B. The pattern 20 of FIGS. 3 and 4 is circular in plan, has a flat base 21 like the resultant dough piece when deposited on a support (an oven band, for instance), and a domed upper surface 22 having a maximum height or thickness at the top centre point 23. Distributed over the surface 22 and extending to and down the sides 24 of the pattern 20 are a network of V-section grooves 25. The nature of the distribution of these grooves 25 is an important feature of this invention. A typical example of this distribution is shown in FIG. 4, but the guide-lines preferably adopted in choosing an arrangement of such grooves 25 are described in more detail below, in conjunction with the 1 cm square grid 26 also shown in FIG. 4 and in conjunction with FIG. 5.

Each groove 25 has a substantially uniform cross-section, with the respective sides making an angle preferably of 35° or, in general, within the range from 20° to 50° and desirably 35°±3°, and having a depth of, say, 1.2 mm or, in general, within the range from 0.5 to 2.0 mm and desirably from 1.0 to 1.5 mm. Any of the grooves 25 can in fact be varied in cross-section at places along its length, if desired, for instance by being tapered off at a point where the groove ends without extending to the sides 24 of the pattern 20 or to another of the grooves 25. As shown in FIG. 4, the grooves 25 which terminate within an area of the pattern surface 22 predominate around the central part of the surface 22. The arrangement of the grooves 25, which in the subsequent baking step encourage the formation of cracks or fissures in the biscuit surface as those shown at 16, 16a, 17, 17a and 17b in FIGS. 2A and 2B, can be applied to the dough piece either separately from its formation or simultaneously, such as is done by the use of moulds made from the pattern 20. However, a mould made from a pattern resembling that shown in FIGS. 3 and 4 can be used, the desired grooves 25 being impressed into the resultant plain dough pieces, for instance by the use of hand moulds or preferably for volume production on a commercial scale, by the use of a rotary moulding machine.

As shown in FIGS. 3 and 4, the pattern 20 produces dough pieces having a diameter of, for example, 50 mm and on baking these produce biscuits such as those shown in FIGS. 2A and 2B having a diameter of, for example, 70 mm. The dough piece thus grows in diameter by as much as 40% during the baking step. The maximum thickness of the dough piece is, for instance, 16 mm at the centre 23 and, during baking, the dough piece spreads by increasing in diameter as just described and reduces to a generally constant thickness of, for instance, 9 to 10 mm. Despite the randomly cracked or fissured upper surface of the product, it is sufficiently regular in its overall size, shape and dimensions for a sufficient number of similar bisscuits, e.g. 10 or more, to be stackable, so that machine stacking, wrapping and packaging can be used. Also, the uniformity of the product is such that the overweight allowance required to ensure that a standard number of biscuits meets the minimum packaged weight can be as low as 3% to 5% in excess of the nominal weight, instead of as much as 15% to 20% as can be required with conventionally manufactured products of the same kind, such as are shown in FIGS. 1A and 1B.

Referring to the 1 cm square grid 26 shown superimposed on the pattern 20 in FIG. 4, one way in which the distribution of the lines or grooves 25 can be characterised is by reference to the number of such lines or grooves or portions thereof to be found in each 1 cm square. On average, there are 2 to 4 portions of the lines per square centimeter.

Figure 5:
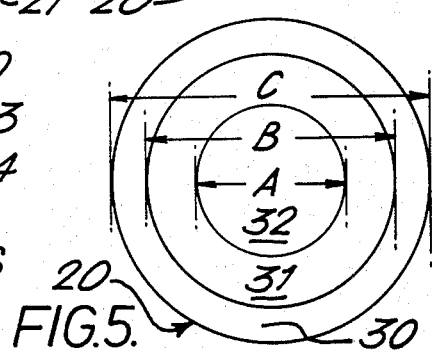
FIG. 5 shows a diagrammatic representation of the top surface of a pattern for making a typical product of the invention, for indicating the network of lines in topological notation.

Referring to FIG. 5, another way in which the distribution of the lines or grooves 25 can be characterized is by reference to the topological properties of the network of the lines 25, preferably expressed in relation to three concentric zones of the pattern 20 and thus of the pre-baked dough piece from which the product is made. In FIG. 5, the pattern 20 comprises an outer zone 30 having a diameter C, an inner zone 31 having a diameter B and a centre zone 32 having a diameter A. These may approximate respectively to the peripheral part of the dough piece which flows outwardly and downwrdly in baking, the part which generally constitutes the rim of the finished product and the centre which bears most of the terminated lines in the prebaked state.

Since a node is a point from which one or more pathways extend, this method of characterization has the advantage that it indicates the probable or actual number of nodes of various orders in the zones of the circular plan of the surface and places no directional restraint upon the pathways extending from the nodes. In this specification, therefore, a 1-node is a point having 1 pathway extending from it and thus defines the end of a terminating line, a 2-node is a point having 2 pathways extending from it and this defines any location upon a pathway other than an end or a node of a higher order, a 3-node is a point having 3 pathways extending from it and thus defines a location where one pathway extends to and joins another, a 4-node is a point having 4 pathways extending from it and so on. References 41, 42, 43 and 44 in FIG. 4 indicate examples of 1-, 2-, 3- and 4-nodes.

In general, therefore, the network of the pathways represented by the grooves is as follows:

Zone diameters:
A: B: C=25-75:40-90:100
Network Analysis:

The numbers of 1-nodes, 3-nodes and 4-nodes and higher are given below in ranges of percentages (it will be appreciated that there is no need to specify the percentage of 2-nodes) of the total number of 1-, 3- and 4- and higher nodes present.

| Zone | 1-nodes | 3-nodes | 4-nodes + |
|---|---|---|---|
| 30 | 8-12 | 10-15 | 2-4 |
| 31 | 2-4 | 30-35 | 8-12 |
| 32 | 8-12 | 10-15 | 5-8 |

Preferably, the network of the pathways represented by the grooves 25 is as follows, the figures in parentheses being the actual numbers of nodes present in a 50 mm diameter pattern:
Zone diameters:
A:B:C=50:80:100
Network Analysis:

| Zone | 1-nodes | 3-nodes | 4-nodes + |
|---|---|---|---|
| 30 | 10 (3) | 13 (5) | 3 (1) |
| 31 | 3 (1) | 32 (12) | 10 (3) |
| 32 | 10 (3) | 13 (5) | 6 (2) |

The advantages of the method of the invention include the following:

(a) Typical cookie-type recipes can be used, but so as to give a cracked surface which is consistent and thus characterizes the product;

(b) a greater output can be obtained, especially when using a rotary moulder;

(c) a lower-costed overweight allowance;

(d) controlled flow of the dough, as shown by an increase of 10%-40% of the original diameter of the dough pieces, (e) products are obtained without the normal dependence for this type upon oven conditions and steam spray to guarantee a cracked surface characteristic;

(f) each sample of the product is similar, but different from the others.

The following is a typical cookie recipe, in parts by weight, for the dough used in carrying out this invention:

| | |
|---|---|
| Flour | 100 |
| Fat | 45 |
| Sugar | 50 |
| Leavening | 1 |
| Milk powder | 1 |
| Water | 10 |

This invention thus provides a way to make cookies or biscuits with a cracked surface, using a rotary moulder or otherwise predetermining where all or most of the surface cracking occurs and thus enabling greater uniformity of size, shape and appearance to be achieved than by the use of known methods.

What is claimed is:

1. A method of manufacture of a randomly fissured biscuit or cookie product, which comprises the steps of:
providing a predetermined quantity of an unbaked dough;
forming the quantity of the dough into a shaped unbaked dough piece having an upper surface which incorporates a network of impressed lines, a major proportion of the lines in the network being non-terminated and a minor proportion of the lines in the network being terminated at least at one location; and
baking the shaped dough piece under such baking conditions whereby its diameter increases and its upper surface includes random superficial fissures along at least some of the impressed lines of the network and also at least some of those areas of the upper surface of the unbaked dough piece which were not provided with any of the impressed lines of the network.

2. The method of claim 1, wherein the quantity of dough is first formed into the shaped unbaked dough piece and then the network of lines is impressed into the upper surface of the dough piece.

3. The method of claim 1, wherein the quantity of dough is formed in a single moulding step into the shaped unbaked dough piece having the network of lines impressed into its upper surface.

4. The method of claim 1, wherein the unbaked dough piece is formed with a domed upper surface into which the network of lines is impressed.

5. The method of claim 1, wherein the lines comprise grooves in the unbaked dough piece.

6. The method of claim 5, wherein the grooves forming the lines have sides which form an angle within the range from 20° to 50°.

7. The method of claim 5, wherein the lines have a depth in the range from 0.5 to 2 mm.

8. The method of claim 5, wherein the quantity of dough is first formed into the shaped unbaked dough piece and then the network of lines is impressed into the upper surface of the dough piece.

9. The method of claim 5, wherein the quantity of dough is formed in a single moulding step into the shaped unbaked dough piece having the network of lines impressed into its upper surface.

10. A method of manufacture of a randomly fissured biscuit or cookie product, which comprises the steps of:
providing a predetermined quantity of an unbaked dough;
forming the quantity of the dough into a shaped unbaked dough piece having an upper surface which incorporates a network of impressed lines in the form of U-shaped, W-shaped or V-shaped grooves, from 60% to 90% of the total length of the lines upon the top surface of the unbaked dough piece continuing across such surface and intersecting either the edge of the dough piece or another line and, thereby, constituting non-terminated lines, and the remaining 40% to 10% of the total length of the lines being terminated lines which end short of either the edge or another line at least at one end of said terminated lines; and
baking the shaped dough piece under such baking conditions whereby its diameter increases and its upper surface includes random superficial fissures along at least some of the impressed lines of the network and also in at least some of those areas of the upper surface of the unbaked dough piece which were not provided with any of the impressed lines of the network.

11. The method of claim 8, wherein the quantity of dough is first formed into the shaped unbaked dough piece and then the network of lines is impressed into the upper surface of the dough piece.

12. The method of claim 8, wherein the quantity of dough is formed in a single moulding step into the shaped unbaked dough piece having the network of lines impressed into its domed upper surface.

13. The method of claim 10, wherein the unbaked dough piece is formed with a domed upper surface into which the network of lines is impressed.

14. The method of claim 11, wherein the unbaked dough piece is formed with a domed upper surface into which the network of lines is impressed.

15. The method of claim 12, wherein the unbaked dough piece is formed with a domed upper surface into which the network of lines is impressed.

16. A method of manufacture of a randomly fissured biscuit or cookie food product, which comprises:
forming a shaped unbaked dough piece having an upper surface;
impressing a network of lines into said upper surface either in conjunction with formation of the dough piece or subsequently thereto, said network of lines including a major proportion which are non-terminated and a minor proportion which are terminated at least at one location; and
baking the dough piece under such conditions whereby its diameter increases by at least one-tenth up to one-half and random fissures are formed along all or most of said impressed lines and in at least some of those areas of the surface not provided with any of said impressed network of lines.

* * * * *

UNITED STATES PATENT AND TRADEMARK OFFICE
CERTIFICATE OF CORRECTION

PATENT NO. : 4,517,209
DATED : May 14, 1985
INVENTOR(S) : Ian Thornton, Kenneth W. DeWitt, Simon A. Robertson It is certified that error appears in the above-identified patent and that said Letters Patent are hereby corrected as shown below:

```
Col. 4, Line 58:  Change "emphasise" to --emphasize--.
Col. 4, Line 60:  Change "emphasise" to --emphasize--.
Col. 5, Line 11:  Change "emphasise" to --emphasize--.
Col. 6, Line 21:  Change "guide-lines" to --guidelines--.
Col. 7, Lines 9 and 10:  Change "characterised" to
                              --characterized--.
Claim 11, Line 1:  Change "8" to --10--.
Claim 12, Line 1:  Change "8" to --10--.
```

Signed and Sealed this

Fifteenth Day of October 1985

[SEAL]

Attest:

Attesting Officer

DONALD J. QUIGG

Commissioner of Patents and
Trademarks—Designate